UNITED STATES PATENT OFFICE 2,643,531

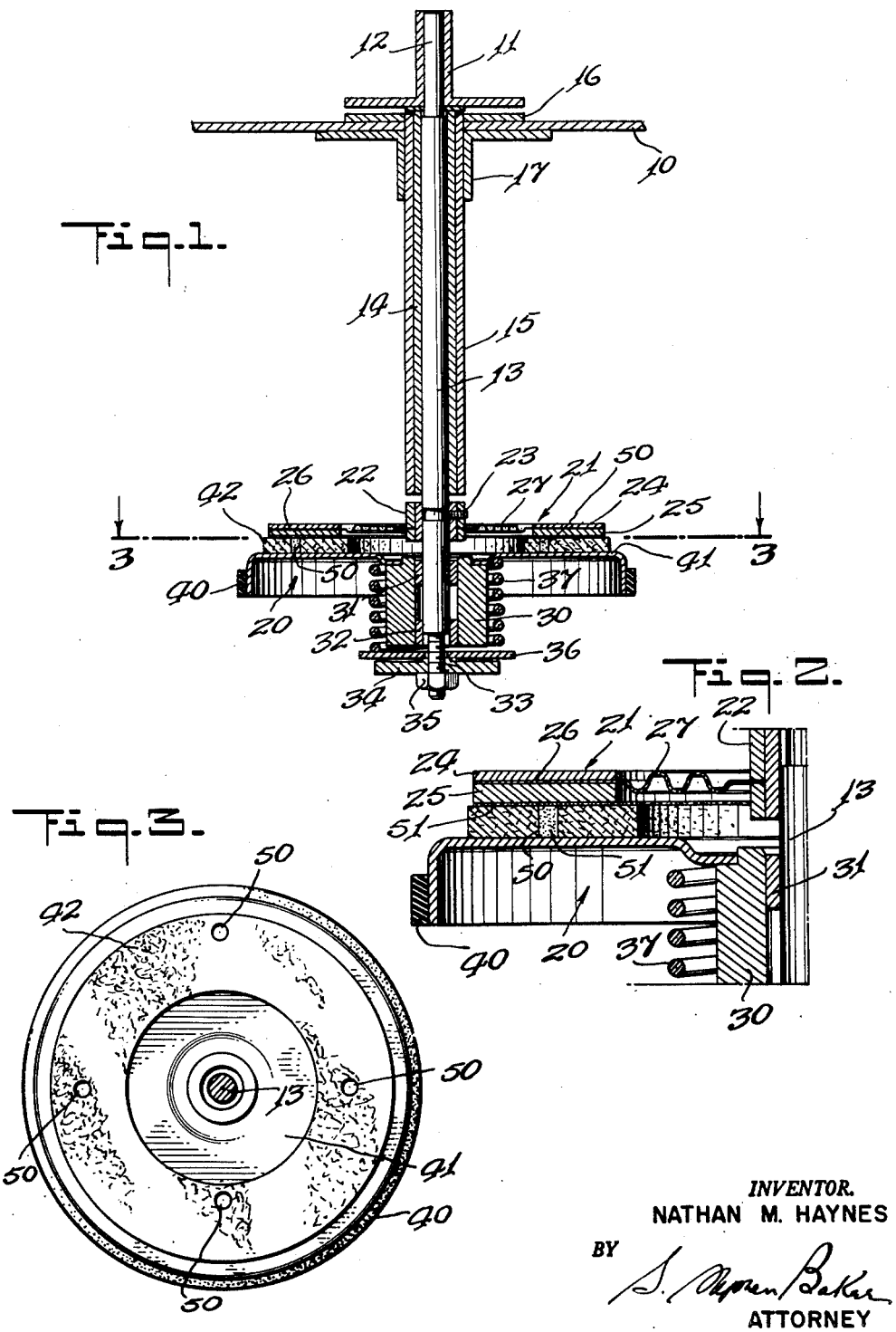

SLIPPING CLUTCH

Nathan M. Haynes, New York, N. Y.

Application September 1, 1950, Serial No. 182,809

5 Claims. (Cl. 64—30)

This invention relates to clutches as used in magnetic recorders where a constant speed of the tape or wire is required.

This application discloses an improvement over the structure described in my previous application Serial No. 79,171, filed March 2, 1949, now abandoned, and wherein many of the mechanical details of the instant clutch are shown and described. In my above mentioned prior application, I discussed the necessity of employing a slipping clutch for such magnetic recorders. Briefly, the tape or wire must be driven at a constant speed notwithstanding the fact that the reels rotate at a speed which is proportional to the diameter of the tape which is wound thereon. A motor is usually provided for driving the reel, but since the rotating speed of the reel necessarily varies as the tape winds thereon, the use of a slipping clutch or the like is required. As the constant speed mechanism supplies a predetermined and regulated travel of tape, the take-up reel is only permitted to receive such tape as it is fed, at a predetermined speed. Inasmuch as a take-up reel tends to run faster than required, the feed tape itself restrains the reel from over-acceleration, and the slipping clutch predetermines the resistance of the reel drive to the tape tension and maintains such tension constant.

A slipping clutch, as above generally described, comprises two clutch plates, the driven one being connected to the take-up reel. The driving clutch plate is provided with a clutch surface which may slip and it has been found that a felt surface or the like is very satisfactory for this purpose. However, it is most important that a predetermined clutch torque should be maintained at all times during the operation of the clutch so that the tension of the tape is maintained constant as required.

In my previous application, I described a mechanism which maintains the clutch plates in proper engagement notwithstanding compacting of the felt surface of the driving clutch plate after a period of operation. While this expedient is important, it is further important to maintain lubrication of the felt surface as will be understood to those skilled in the art. If such surface is not maintained lubricated, it results in irregularity of slipping clutch action and unsatisfactory operation.

Lubrication of the felt surface has presented many difficulties in the past in that the initially applied lubrication would fail after a period of use. In any event, it would become worse unless the lubrication was restored. It is at present considered that restoration of lubrication of the clutch surface does not solve the problem because the consumer is generally unable to perform this operation. As a result, it is most desirable that means be taken at the factory for providing such lubrication as will remain over very long periods of time and at a high degree of efficiency.

With the foregoing in mind, I have devised a felt structure which permits the incorporation therewith of a dry or powdered lubricant which lasts for almost the life of the clutch. Ordinarily, this may be a number of years. The objective is accomplished by using a lubricant such as zinc stearate and providing reservoirs in the felt pad itself which are drawn upon as the felt surface wears down. The reservoirs take the form of holes in the felt pad which are so disposed as to provide an overall and uniform distribution of lubricant without unduly interfering with the area of clutch contact. The invention will be further understood from the following description and drawings in which:

Fig. 1 is a fragmentary view of a magnetic recorder mechanism showing the take-up reel and the slipping clutch.

Fig. 2 is an enlarged, fragmentary, cross-sectional view of the slipping clutch shown in Fig. 1.

Fig. 3 is a view as taken along the lines 3—3 of Fig. 1.

Although the instant invention resides in details of the slipping clutch itself, it will be noted that the clutch is illustrated in Fig. 1 as disposed in a tape recorder chassis. Briefly, plate 10 may be the operating panel of the recorder upon which the reels are positioned. The take-up reel is deposited over post 11 which is frictionally secured over the reduced end 12 of clutch shaft 13. A tubular bushing 14 embraces the clutch shaft. A sleeve 15 surrounds the bushing 14 and it is formed with a flange 16 which rests upon panel 10. A collar 17 embraces sleeve 15 and firmly secures it to the underside of panel 10 as by any suitable means. The foregoing mechanism is merely illustrative of any suitable means for driving a take-up reel or the like and is described and illustrated as disclosing a typical environment for the invention of the instant application.

The slipping clutch disclosed herein comprises clutch wheels 20 and 21. Clutch wheel 21 represents the driven clutch plate and it is secured by its hub 22 to the shaft 13 by means of set screw 23. It will be understood therefore that rotation of clutch plate 21 effects corresponding rotation of shaft 13.

As set forth in my prior application, the driven clutch plate 21 comprises metal annulus 24 and metal annulus 25 between which is laminated the outer edge 26 of resilient disk 27. Elements 24, 25 and 26 may be spot welded to each other, such elements being therefore substantially integral and comprising the driven clutch plate. Resilient disk 27 is formed of corrugations of a resilient metal such as beryllium copper or spring steel. Its purpose is to permit the driven clutch plate 21 to adapt itself to irregularities in the driving surface or suspension of the driving clutch wheel or plate 20.

Driving clutch plate 20 includes a hub 30 which is free in respect to shaft 13, collars or bushings 31 and 32 being secured to hub 30 and being rotatable with respect to shaft 13. The lower end 33 of shaft 13 is threaded and carries a threaded, manually rotatable, knurled wheel 34 and hub 30. A spring 37 is disposed between plate 20 and washer 36 so that the plate 20 is always urged into appropriate contact with driven clutch plate 21 as was set forth in my prior application. A rubber ring 40 is secured to the perpendicular flange of plate 20 so as to increase frictional contact with a driving disk not shown.

To the face 41 of clutch plate 20 is secured a felt annulus 42 which embodies the instant invention. Felt annulus 42 comprises the clutch surface of the driving clutch plate 20 and may be secured to face 41 by adhesive or other means. In order to provide suitable lubrication between the felt 42 and the driven clutch plate 21, a deposit of dry lubricant such as zinc stearate is applied to the surface of the felt annulus or pad 42.

Zinc stearate is generally prepared in powder form like powdered graphite. The instant invention is not to be limited to the use of zinc stearate although this material has been very satisfactory for the purpose. It is applied to the felt pad 42 by merely rubbing the surface of the pad over a quantity of the zinc stearate so that it fills the surface pores and irregularities of the pad. However, it will be evident that such application would be insufficient because during the operation of the device the powdered lubricant would obviously be eventually dispelled and its effect lost. Accordingly, I have devised a method of incorporating a reservoir of the dry lubricant in the felt pad without substantially affecting the function of the pad. Thus, a series of openings 50 are formed through the felt pad and into which a quantity of the lubricant 51 may be deposited. The openings or holes 50 are formed transversely of the pad so that they effectively extend therethrough. It will be understood that as the felt pad wears down during use, more lubricant will automatically be applied to the felt surface, such additional lubricant coming from the filled holes. It will further be observed that the holes 50 are variably and progressively radially graduated relative to the imaginary center of the felt annulus. Or, stated in other words, the holes are respectively graduated further outwardly so that the lubricant therein may treat substantially all areas of the felt pad. The radial point where one opening terminates marks the point where the next opening commences or, indeed, the openings may overlap slightly radially so that successive radial areas of the pad may receive the lubricant without discontinuity.

It will be understood that as the felt pad wears down the powdered lubricant 51 that appears in any one hole becomes distributed, through rotation of the pad, in a circular path having a width roughly equivalent to the diameter of the hole and disposed on the felt pad in the position of the hole. Four such paths will be provided by the spaced holes 50 and the paths will be continuous and will produce lubrication for substantially the entire surface of the felt pad. While such distribution might have been effected by providing concentric grooves, it is considered that such grooves would disadvantageously affect the area of driving surface and is therefore considered inferior to the holes disposed as provided herein.

A slipping clutch provided with the felt pad of the instant invention having the holes as disclosed and filled with zinc stearate exhibited marked efficiency over long periods of time, after having undergone tests which had disabled any other type of clutch suitable for the instant purpose. Practically no lubrication servicing of the clutch plates is required since it was found by a life test that the lubrication would continue during the normal life of the clutch plate. The lubrication is further found to be fed uniformly and reliably since it becomes equally disposed over substantially the entire felt surface and is automatically fed in response to wearing down of the felt surface.

What is claimed is:

1. A slipping clutch comprising a driven clutch plate, a driving clutch plate for engagement therewith, a planar compressible felt pad on the drive surface of one of said plates and adapted to effect a slipping engagement with the other clutch plate, said compressible felt pad having a series of transverse openings formed therethrough and adapted to receive and contain a powdered lubricant.

2. A slipping clutch according to claim 1 and wherein said felt pad is annular in form, said openings being angularly spaced around said pad and being cylindrical and continuous through the pad.

3. A slipping clutch according to claim 2 and wherein said openings are further radially graduated across the felt pad.

4. A slipping clutch comprising a driven clutch plate, a driving clutch plate for engagement therewith, a compressible felt pad on the drive surface of one of said plates and adapted to effect a slipping engagement with the other clutch plate, said compressible felt pad having a series of transverse openings formed therethrough for receiving a powdered lubricant, said felt pad being circular in form and said series comprising four openings spaced 90 degrees apart and each being radially graduated with respect to the other.

5. A slipping clutch comprising a driven clutch plate, a driving clutch plate for engagement therewith, a compressible felt pad on the drive surface of one of said plates and adapted to effect a slipping engagement with the other clutch plate, said compressible felt pad having a series of transverse openings formed therethrough for receiving a powdered lubricant, said felt pad being annular in form and said series comprising four openings spaced 90 degrees apart and each being radially graduated with respect to each other, each successive opening commencing substantially at the radial termination of a preceding opening so that radially successive concentric areas of said pad may be provided with lubricant from said openings as the clutch plates slip with respect to each other.

NATHAN M. HAYNES.

References Cited in the file of this patent

UNITED STATES PATENTS

| Number | Name | Date |
|---|---|---|
| 804,104 | De Dion | Nov. 7, 1905 |
| 1,365,732 | Schmid et al. | Jan. 18, 1921 |
| 1,485,180 | Gray | Feb. 26, 1924 |
| 1,681,371 | Slade | Aug. 21, 1928 |

FOREIGN PATENTS

| Number | Country | Date |
|---|---|---|
| 23,655 | Austria | 1906 |